Oct. 4, 1932.  M. PEREDA  1,881,290
FLEXIBLE TIRE FOR VEHICLES
Filed Sept. 30, 1931  2 Sheets-Sheet 1
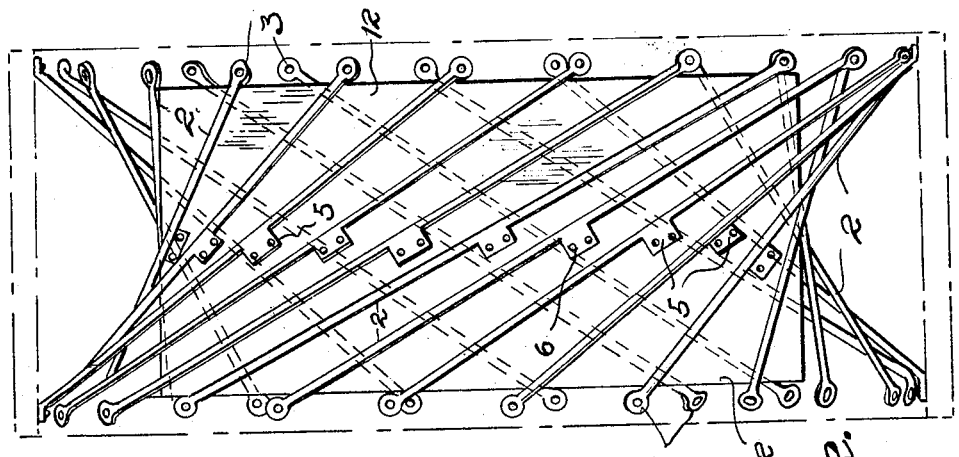
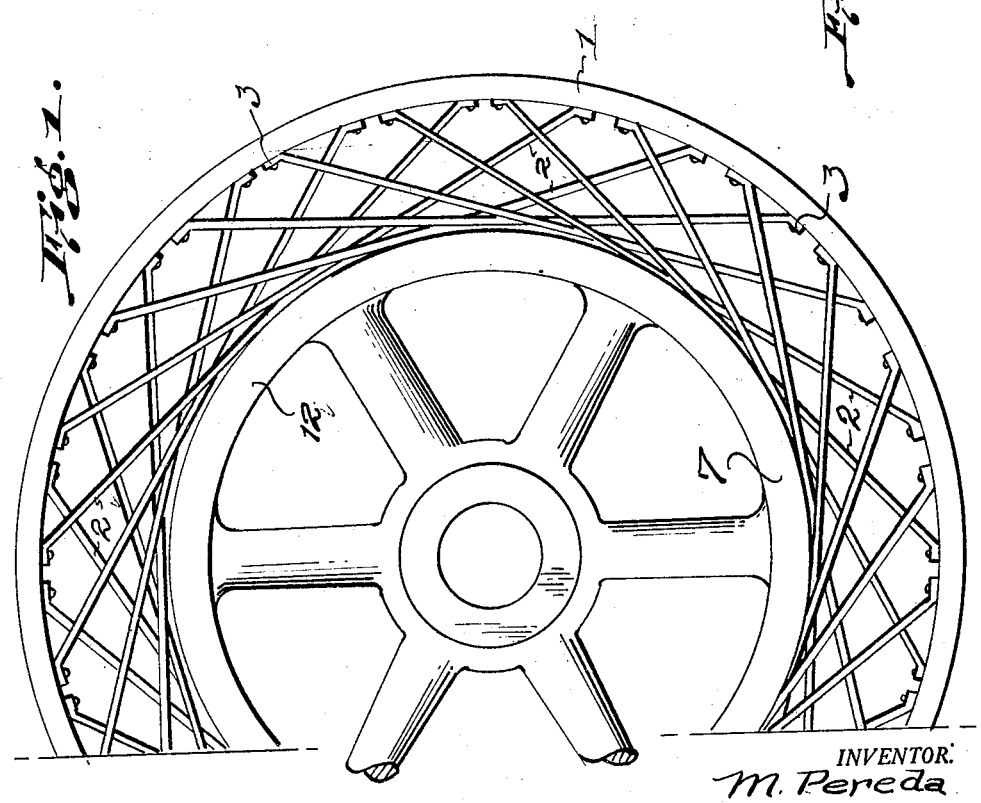
INVENTOR.
M. Pereda
BY: Marks & Clerk
ATTORNEYS.

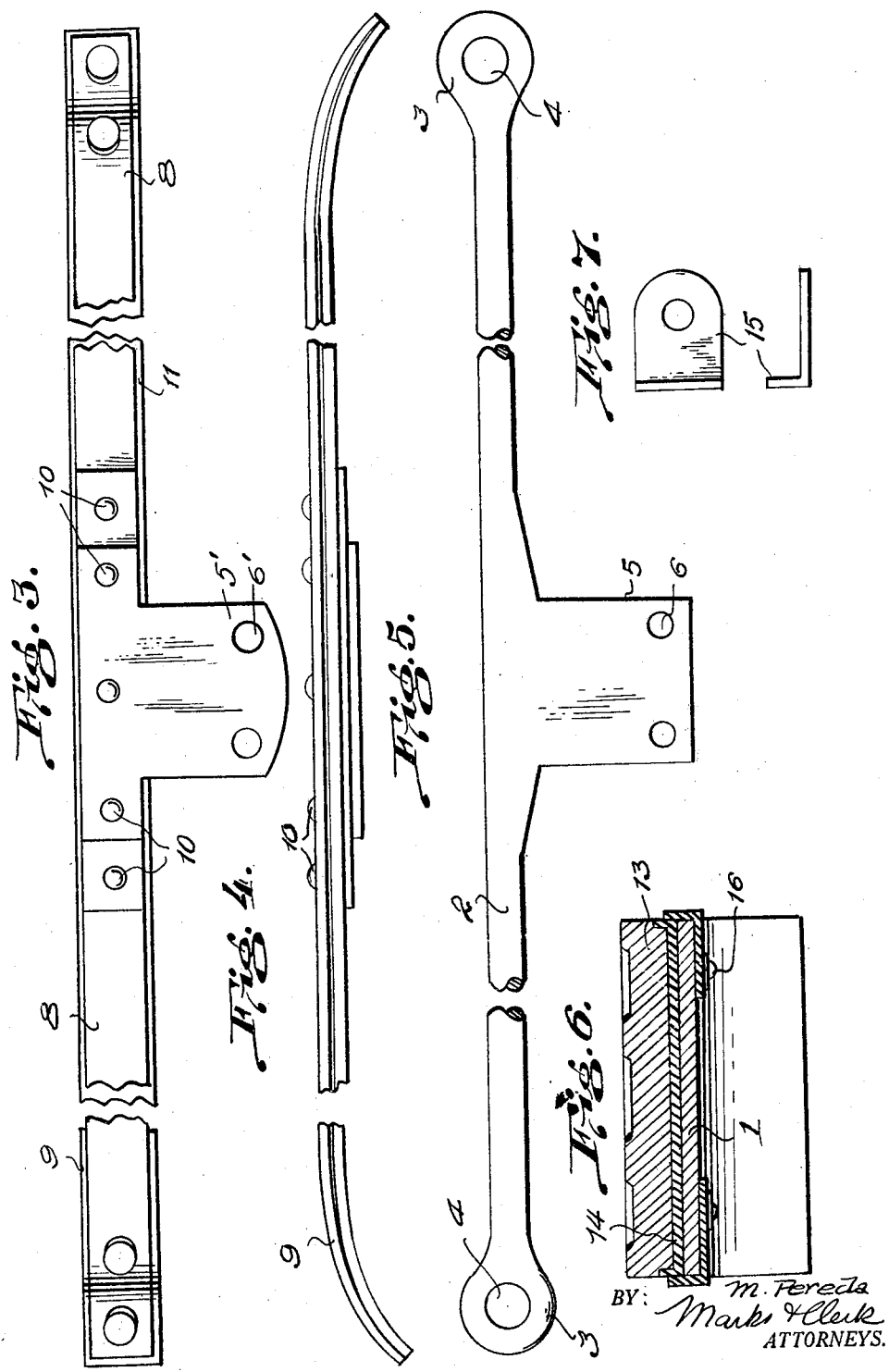

Patented Oct. 4, 1932

1,881,290

UNITED STATES PATENT OFFICE

MANUEL PEREDA, OF BUENOS AIRES, ARGENTINA

FLEXIBLE TIRES FOR VEHICLES

Application filed September 30, 1931. Serial No. 566,142.

This invention consists of a new type of flexible tire for all sorts of vehicles, a new type of a purely mechanical nature, which can be applied to any vehicle whatever, and which, due to its flexibility and special construction counteracts the jumps and the shaking of the vehicle provided with it, thus rendering it unnecessary to use the ordinary pneumatic or solid tires, the first of which unfortunately are somewhat costly.

Moreover, the pnuematic tires are liable often to be punctured and do not last very long; the solid tires, whose use has become so general today, especially for carts and motor trucks, for heavy loads, are subjected to the disadvantage of the strong vibrations originated by the weight of the truck itself, which rapidly causes the destruction of the roads and of the pavements.

With the object of solving this problem, together with other difficulties, I have invented a new type of flexible tire, the invention in question, which is also useful from other points of view, as will be shown later on, in this report, as well as in the diverse clauses of my claims or revindication.

In order that this invention be clearly explained and comprehended, and put into practise without any difficulty, I attach drawings representing it under diverse aspects, as follows:—

No. 1 gives a partial plan view of the tire, with the exterior tire removed but represented by dotted lines to indicate the relative position when in place, showing this new invention, my flexible tire.

No. 2 offers a partial and front view of the tire, showing the arrangement of the rods or elastic bars which form it.

No. 3 represents a bottom view of one of the types of bars used in the construction of these flexible tires.

No. 4 offers a side view of the bar or rod already referred to.

No. 5 represents the type of rod shown in Figures 1 and 2, which is of a simpler character than the one shown in Figures 3 and 4.

No. 6 gives a section which shows in detail the manner of fitting the india-rubber tire, and finally, No. 7 shows the washer for the joining of the india-rubber tire, and the exterior metal tire.

In all these drawings I have used identical figures for reference numbers, of the same or corresponding parts.

In the manner of construction shown in the above drawings, this new type of flexible tire, which is my invention, is formed by a ring tire, 1, made of iron, of steel, or of any other similar elastic material, on to whose inside superficies I bolt the ends of elastic bars, or rods; the details of which may be observed by reference to drawings Nos. 3 to 5.

These rods, as may be observed by referring to drawing No. 1, are fixed to the exterior tire, so that each of them have a certain geometrical position, and are bent in relation to the level of the tire in question, i. e. whilst one of their ends is bolted to the edge, the other end of the bar reaches the contrary edge of the same tire. Due to the manner of placing the bars, the centers of the bars act as a support for the ring or inside tire of the vehicle's wheel.

The elastic bars, or rods, also made of steel, or of any elastic and suitable material, may, as shown in drawings 3 and 5, be formed by whole rods, or by diverse pieces in combination, and joined in such a manner as to constitute one sole piece; in the first case, as represented in drawing No. 5, the piece referred to, is constituted by one sole bar, 2, of a suitable form and section, whose ends are flattened, 3, and with a perforation 4, through which penetrates a bolt, which unites the rod to the tire, exterior, 1.

At the middle of this rod, is fixed, by soldering, or by any other method, a piece, 5, with two or more holes, 6, for joining that piece to the inside tire 7, fitted on the wheel of the vehicle.

The rod shown in drawings Nos. 3 and 4, is of slightly different construction, as compared with the foregoing one, and that diversity, as may easily be seen, consists in the circumstance that it is formed by two metal pieces, 8 and 9, joined together by a number of rivets 10, which also act as a joint fixing the centre pieces 11 and 5', the last of which has the holes 6, for the purpose of uniting said piece to the inside tire 7, as I have already explained when referring to the previous type of tire.

As remarked elsewhere, the bars or rods are joined at both of their ends to the outside tire, 1, in such a manner that they form together a superficies of revolution, in whose median plane are found the pieces 5, which fit on the outside surface of the inside tire 7, which fits into the central crown 12 of the wheel of the vehicle, whilst the tire 7, is concentrically placed on the former.

The corresponding pieces 5, of each of the rods, join or are fitted in, and then bolted on the interior tire, already referred to above, and this all together forms the flexible tire which constitutes my invention.

As may be seen by reference to drawing No. 1, each of the rods is at its axis a geometric line from the outside tire, 1, and at the same time is placed in such a manner as to be a tangent relative to the ring crown (interior) 7, with the object of its being safely and perfectly fitted.

The bars or rods, of an elastic nature, can also be made of two or more separate pieces, which then are joined up in a suitable manner, to a common centre.

The flexible tire, made in the manner I have just explained, constitutes the outside periphery of the wheel, and can be fitted thereon in the same way as an india rubber tire, of the kind generally in use.

The flexible tire, formed in the manner I have described, has on its exterior 1, an india-rubber tire, solid, 13, but rather thin, fitted on a metal ring, 14, which is held by clips, 15, fixed against both sides, of tire 1, by means of bolts 16.

The number of bars may naturally vary, within a reasonable limit, as may be necessary taking into consideration the maximum weight and speed of the vehicle, and they may be straight or slightly curved, as may best be adapted in use.

The heads, 3, of the rods, instead of being round, as shown in the drawing, can be lengthened, like a crocodile's head, so that they can be perforated 4, for joining them to the tire 1. On the other hand, if flat rods or bars be employed, as shown in drawings Nos. 3 and 4, their ends can be doubled round, in such a way that they may be joined up by means of a bolt or soldered to the outside tire, bridge like; this operation has as its object to allow a certain looseness at the end of each rod, so as to increase flexibility, and thus avoid having to perforate the outside tire so as to fix the rods, and in this case I have no perforations whatever.

This type of tire, whose construction I have just detailed,—has, as may easily be comprehended, characteristic advantages over all similar types, as it very efficaciously serves to deaden vibration of vehicles, caused by the bad state of the roads. The cheapness and the facility of use of my tire, constitute valuable factors in favor of its application.

This invention, as above explained, is easily comprehended, and requires no further explanation for persons technically competent in this matter.

It is evident that certain modifications might be introduced in the construction of this tire, without its losing its characteristics, as clearly specified in the following claims, or revindication of rights.

Having already described in detail the characteristics of this invention, and the application thereof practically, I hereby declare as characteristics of my invention, of my sole and exclusive rights and property, the following:—

1. A resilient tire for wheels comprising inner and outer rings connected by a series of resilient rods disposed in crossed relation between the rings and having their ends fixed to the outer ring, the middle portions of the rods corresponding to the vertex of a paraboloid as revolved about an axis parallel to its directrix, plates carried by the middle portions of the rods, said plates having holes therein, bolts passable through the holes and inner rings to fix the plates to the inner ring, the rods being disposed in such manner as if they were geometrical strings fixed at their ends to the outer ring and thus forming a flexible body between the rings.

2. A resilient tire for wheels comprising an inner and an outer ring, a plurality of resilient rods disposed crosswise between the rings and having their ends fixed to the outer ring, the center parts of the rods corresponding to the vertex of a paraboloid as revolved about an axis parallel to its directrix, and means carried by the rods for securing the middle portions thereof to the inner ring.

3. A vehicle tire as claimed in claim 2, wherein the rods are provided with plates adapted to be fixed to the inner ring.

In testimony whereof I affix my signature.

MANUEL PEREDA.